United States Patent
Paul et al.

(10) Patent No.: US 9,749,592 B2
(45) Date of Patent: Aug. 29, 2017

(54) PROCESSING OF IMAGE DATA COMPRISING EFFECTS OF TURBULENCE IN A LIQUID MEDIUM

(75) Inventors: Nicolas Paul, Montreuil (FR); Antoine De Chillaz, Issy les Moulineaux (FR)

(73) Assignee: Electricite de France, Paris (FR)

(*) Notice: Subject to any disclaimer, the term of this patent is extended or adjusted under 35 U.S.C. 154(b) by 568 days.

(21) Appl. No.: 13/980,394

(22) PCT Filed: Jan. 9, 2012

(86) PCT No.: PCT/FR2012/050055
§ 371 (c)(1),
(2), (4) Date: Jul. 18, 2013

(87) PCT Pub. No.: WO2012/101355
PCT Pub. Date: Aug. 2, 2012

(65) Prior Publication Data
US 2013/0300856 A1    Nov. 14, 2013

(30) Foreign Application Priority Data
Jan. 28, 2011  (FR) ...................................... 11 50655

(51) Int. Cl.
*H04N 7/18*  (2006.01)
*G06T 5/00*  (2006.01)

(52) U.S. Cl.
CPC ............... *H04N 7/18* (2013.01); *G06T 5/003* (2013.01); *G06T 2207/10016* (2013.01); *G06T 2207/20216* (2013.01); *G06T 2207/30108* (2013.01)

(58) Field of Classification Search
CPC ....................................................... H04N 7/18
See application file for complete search history.

(56) References Cited

U.S. PATENT DOCUMENTS

| | | | | |
|---|---|---|---|---|
| 4,868,671 A | * | 9/1989 | Murakami | H04N 1/409 |
| | | | | 348/E5.081 |
| 5,296,937 A | * | 3/1994 | Nakatani | H03H 17/04 |
| | | | | 348/E5.078 |
| 5,343,284 A | * | 8/1994 | Keeler | G01S 7/4811 |
| | | | | 348/144 |

(Continued)

FOREIGN PATENT DOCUMENTS

| | | |
|---|---|---|
| CN | 101699509 A | 4/2010 |
| EP | 0 466 252 A2 | 1/1992 |
| JP | 06-60180 A | 3/1994 |
| JP | 11-166993 A | 6/1999 |
| JP | 2002-329193 A | 11/2002 |

(Continued)

OTHER PUBLICATIONS

Zhishen et al., ROV Based Underwater Blurred Image Restoration, 2003, ISSN 1671-2463, pp. 85-885.*

(Continued)

*Primary Examiner* — Peter D Le
(74) *Attorney, Agent, or Firm* — Drinker Biddle & Reath LLP (57) ABSTRACT

Disclosed herein is a method for processing of successive digital image data, acquired by a camera immersed in a liquid comprising turbulence, such as water in a nuclear reactor core, this turbulence causing an effect of apparent displacement of pixels of the images. The processing comprises advantageously: a modelling of the effect of the turbulence on the pixels of the images, and a deconvolution by this modelling of a time-averaged image.

21 Claims, 3 Drawing Sheets

(56) References Cited

U.S. PATENT DOCUMENTS

| | | | | |
|---|---|---|---|---|
| 5,467,122 | A | * | 11/1995 | Bowker ............... H04N 7/183 348/144 |
| 5,742,355 | A | * | 4/1998 | De Haan ............... H04N 5/21 348/607 |
| 5,912,934 | A | | 6/1999 | Acks et al. |
| 6,091,443 | A | * | 7/2000 | Ford ............... A01K 91/08 348/81 |
| 6,097,424 | A | * | 8/2000 | Zernov ............... H04N 7/18 348/373 |
| H001914 | H | * | 11/2000 | Watkins ............... H04N 7/181 348/143 |
| 6,434,254 | B1 | * | 8/2002 | Wixson ............... G06K 9/00785 348/122 |
| 2006/0008137 | A1 | * | 1/2006 | Nagahdaripour .... G06K 9/0063 382/154 |
| 2008/0075358 | A1 | * | 3/2008 | Yu ............... G06T 7/0018 382/154 |
| 2008/0246848 | A1 | * | 10/2008 | Tsubaki ............... G06T 7/20 348/208.4 |
| 2009/0025430 | A1 | | 1/2009 | Tanaka et al. |
| 2009/0252430 | A1 | | 10/2009 | Hou et al. |

FOREIGN PATENT DOCUMENTS

| | | |
|---|---|---|
| JP | 2004-101315 A | 4/2004 |
| JP | 2010-049322 A | 3/2010 |

OTHER PUBLICATIONS

Paleologu et al., A Robust Variable Forgetting Factor Recursive Least-Squares Algorithm for System Identification, 2008, IEEE Signal Processing, vol. 15.*

Young et al, Fundamentals of Image Processing, 1998, ISBN 90-75691-01-7, Only relevant sections of the book.*

Austin et al., The Index of Refraction of Seawater, Jan. 1976, Scripps Institution of Oceanography (UCSD), pp. 1-124.*

Ogawa et al., "Band-Suppressed Restoration of Images Degrated by Atmospheric Turbulence," Journal of the Institute of Electronics, Information and Communication Engineers, Japan, vol. J80-D-II (12), pp. 3155-3163 (Dec. 25, 1997).

Shimizu et al., "Super-Resolution Processing Using Irregular Displacement of a Distant Object Caused by Air Turbulence," Journal of the Institute of Image Electronics Engineers of Japan, vol. 37(4), pp. 387-395 (Jul. 25, 2008).

English Translation of Office Action issued for JP 2013-550931 (Jun. 9, 2014).

Ogawa et al., "Band-Suppressed Restoration of Images Degrated by Atmospheric Turbulence," Journal of the Institute of Electronics, Information and Communication Engineers, Japan, vol. J80-D-11 (12), pp. 3155-3163 (Dec. 25, 1997).

Hou, "A simple underwater imaging model", Optics Letters, Sep. 1, 2009, 34(17):2688-2690.

Zhang et al., English-language abstract for "Processing Method for Underwater Degenerative Image", Journal of Tianjin University, Sep. 2010, 43(9):827-833.

English translation of Office Action issued in CN 201280006936.4, Jul. 21, 2015, 10 pages.

Search report and written opinion issued in EP 12702599.7, Jul. 30, 2015, 6 pages.

English Translation of Office Action issued for RU 2013139709 (Jan. 29, 2015).

Lycksam et al., "Wiener filtering of interferometry measurements through turbulent air using an exponential forgetting factor," Applied Optics, Optical Society of America, Washington, DC, US, vol. 47(16), pp. 2971-2978 (Jun. 1, 2008).

* cited by examiner

PROCESSING OF IMAGE DATA COMPRISING EFFECTS OF TURBULENCE IN A LIQUID MEDIUM

CROSS-REFERENCE TO RELATED APPLICATIONS

This application is the U.S. national phase of the International Patent Application No. PCT/FR2012/050055 filed Jan. 9, 2012, which claims the benefit of French Application No. 11 50655 filed Jan. 28, 2011, the entire content of which is incorporated herein by reference.

FIELD

The present invention relates to the processing of digital image data.

BACKGROUND

It is, in particular, aimed at the processing of successive images (typically of a filmed sequence). These images are acquired by a camera and, in particular, the camera is immersed in a liquid in which turbulence is present. For example, these turbulence effects may be due to non-uniformities in the liquid medium, such as local differences in temperature. Such turbulence phenomena cause an effect of apparent displacement of pixels of the images. For example, a local difference in temperature in a region corresponding to an image edge leads to turbulence phenomena whose effect on the filmed images manifests itself by a perturbation of the pixels in this image edge with an apparent displacement (with respect to an origin position) of some of these pixels, this displacement being variable over time (in a random manner).

The random nature of these variations leads to a difficulty (or even an impossibility) in the processing of the images in order to remove the turbulence effects from them.

SUMMARY

The present invention aims to improve the situation.

For this purpose, it provides a method for processing image data of the aforementioned type, comprising in particular:
  modeling of the effect of the turbulence on the pixels of the images, and
  a de-convolution by said modeling of a time-averaged image.

Advantageously, it has indeed been observed that it was possible to perfectly model the effect of the turbulence, but over a relatively long period. Thus, averaging the pixels of an image over time allows the effect of the turbulence to be "squashed". An average, blurred, image is obtained. In order to render this image sharp, a de-convolution is applied to it by a model representing turbulence effects.

Of course, it is assumed that the scene filmed by the camera is fixed, although one embodiment presented later on in the present description deals with the case of a camera in translation with respect to a static scene.

In one advantageous embodiment, the aforementioned modeling of the turbulence effects comprises the estimation of a model h(u) of probability density for a displacement vector u related to the turbulence effect. It has been observed in particular that, in a particularly advantageous manner, a probabilistic modeling of the effect of the turbulence on the pixels of the images allowed the problem of modeling the hitherto random turbulences to be perfectly well addressed.

One example of advantageous model is of the exponentially-decreasing type, and may be expressed as a function of the vector u by an equation of the type:

$$h_\sigma(u) = \frac{A}{\sigma^2}\exp\left\{-\frac{B\|u\|}{\sigma}\right\}$$

where:
  σ represents the standard deviation of the norm of the vector u,
  A and B are positive real constants, such as for example A=3/π and B=√6.

Other embodiments are possible and will be described hereinbelow.

As far as the estimation of the time-averaged image is concerned, in one possible embodiment, an average weighted by powers of a forgetting factor (hereinafter denoted α), respectively decreasing as a function of time, is included.

The averaged image $I_\alpha(x,n)$, estimated at time n for a pixel with vector coordinates x, can then be given by:

$$I_\alpha(x,n) = \frac{1-\alpha}{1-\alpha^n}\sum_{k=0}^{n-1}\alpha^k I(x, n-k)$$

the term α being a real number corresponding to the forgetting factor.

In practice, the time-averaged image may be estimated by a recursive temporal filtering.

Thus, an $n^{th}$ output of the temporal filter, for the time n, denoted $I_f(x,n)$, and the averaged image $I_\alpha(x,n)$ are linked by the equations:

$$I_f(x,n) = \alpha I_f(x, n-1) + (1-\alpha)I(x,n)$$

$$I_\alpha(x,n) = \frac{1}{1-\alpha^n}I_f(x,n)$$

Tests carried out have shown that the forgetting factor α was best if close to 1, while still being less than 1. A value chosen equal to 0.99 gave good results.

Now, as far as the de-convolution by the modeling is concerned, the application of a linear spatial filtering is advantageously included, with an expression corresponding to the aforementioned modeling.

The spatial filtering may advantageously be of the Wiener type, although other embodiments are possible.

The spatial filter is given for example in the spectral domain by an expression of the type:

$$W_\sigma(f) = \frac{H_\sigma^*(f)}{\|H_\sigma(f)\|^2 + \frac{S_b(f)}{S_{sharp}(f)}}, \text{ if } \|f\| \le f_c$$

$$W_\sigma(f) = 0, \text{ if } \|f\| > f_c$$

where:
  f is a two-dimensional vector of two frequencies normalized after two-dimensional Fourier transform, $f_c$ is a cutoff frequency of the filter for eliminating any potential spectral aliasing, $S_b(f)$ and $S_{sharp}(f)$ are respectively spectral power densities of a noise and of a sharp image to be determined, and $H_o(f)$ is the two-dimensional Fourier transform of the probability density of the effect of the turbulence h(u).

A simplification of this expression amounts to considering the spatial filter according to a relationship of the type:

$$W_\sigma(f) = \frac{H_\sigma(f)}{H_\sigma^2(f) + RBS}$$

where the term RBS is expressed as a function of parameters chosen in such a manner that the term RBS is in the range between $10^{-2}$ and $10^{-4}$.

With a relationship of the aforementioned type:

$$h_\sigma(u) = \frac{A}{\sigma^2} \exp\left\{-\frac{B\|u\|}{\sigma}\right\},$$

the two-dimensional Fourier transform $H_\sigma(f)$ of the probability density of the effect of the turbulence $h_\sigma(u)$, is given by:

$$H_\sigma(f) = (1 + C(\sigma \cdot \|f\|)^2)^{-\frac{3}{2}}$$

where C is a positive real constant and σ is a positive real number counted in number of pixels.

Taking the values of the constants A and B previously given and completely defining the two-dimensional Fourier transform $H_\sigma(f)$, this may then be given by:

$$H_\sigma(f) = \left(1 + \frac{2}{3}(\pi\sigma \cdot \|f\|)^2\right)^{-\frac{3}{2}}$$

In particular, the tests carried out have shown that the term σ was advantageously to be chosen between 0 and 30 pixels.

As previously stated, the present invention provides an embodiment where the camera can be displaced in translation relative to a static scene. In this case, the processing presented hereinabove may be conserved while nevertheless taking the precaution of applying a repositioning of pixels of an image at a time n−1 to a following image at the time n, then taking into account a speed of displacement of the camera.

Thus, in this embodiment, a repositioning of a preceding image to a current image is carried out for the estimation of the averaged image.

The recursive temporal filtering is then carried out with repositioning and normalization and, in one exemplary embodiment, the overall processing comprises the steps:

for resetting, with:

$I_f(x,1)=0 \ N(x,1)=0$, for recursive temporal filtering, with:

$I_f(x,n)=(1-\alpha)I(x,n)+\alpha I_f(x+\lfloor\delta_{n,n-1}\rfloor,n-1)$.

where $\lfloor\delta_{n,n-1}\rfloor=(\lfloor\delta x_{n,n-1}\rfloor,\lfloor\delta y_{n,n-1}\rfloor)$ corresponds to a vector for row shift x and/or column shift y, rounded to the nearest integers, between the current image n and the preceding image n−1 owing to the translation of the camera, for updating a normalization matrix N, with:

$N(x,n)=(1-\alpha)\times 1+\alpha N(x+\lfloor\delta_{n,n-1}\rfloor,n-1)$ and for normalizing the output of the temporal filter, with:

$$I_m(x,n) = \frac{1}{N(x,n)} I_f(x,n)$$

The present invention is also aimed at a computer program comprising instructions for the implementation of the method hereinbefore when this program is executed by a processor. One example of flow diagram of the general algorithm of such a program is given in FIG. 3 which will be described in detail hereinbelow.

The present invention is also aimed at a device for processing image data, comprising an input for processing successive digital image data, acquired by a camera immersed in a liquid comprising turbulence phenomena causing an effect of apparent displacement of pixels of the images. In particular, such a device furthermore comprises calculation means for the implementation of the method hereinbefore. Such calculation means may include a processor and a working storage for executing for example the instructions of the aforementioned computer program.

The present invention is advantageously applicable to, but is not limited to, the processing of image data acquired by a camera immersed in the water of a nuclear installation, in order to film fuel element assemblies. Such a use of the method in the sense of the invention, in this context, can then comprise at least:

the determination, from the acquired and processed images, of a state of the fuel element assemblies.

For example, in the acquired and processed images, at least one identifier of a fuel element assembly may be determined.

This embodiment advantageously allows the arrangement of the assemblies within the core to be monitored and checked.

The use of the method in the sense of the invention may furthermore comprise:

the measurement, within said images, of a spacing between fuel element assemblies.

This embodiment advantageously allows the respective positions of the assemblies within the core to be precisely monitored and checked.

Finally, it will be understood that the implementation of the method in the sense of the invention in the framework of such a use allows the overall inspection of the state of the assemblies, whether this be in the water of the reactor vessels in the reactor hall or in the storage pond of the fuel hall.

The present invention is also aimed at an installation for the implementation of such a use comprising at least one camera, preferably leak-tight and robust to radiation, connected to a device of the aforementioned type for the implementation of the invention.

BRIEF DESCRIPTION OF THE DRAWINGS

Other advantages and features of the invention will become apparent upon reading the detailed description hereinafter of non-limiting exemplary embodiments, and also upon examining the appended drawings, in which.

DETAILED DESCRIPTION

Figure 1:
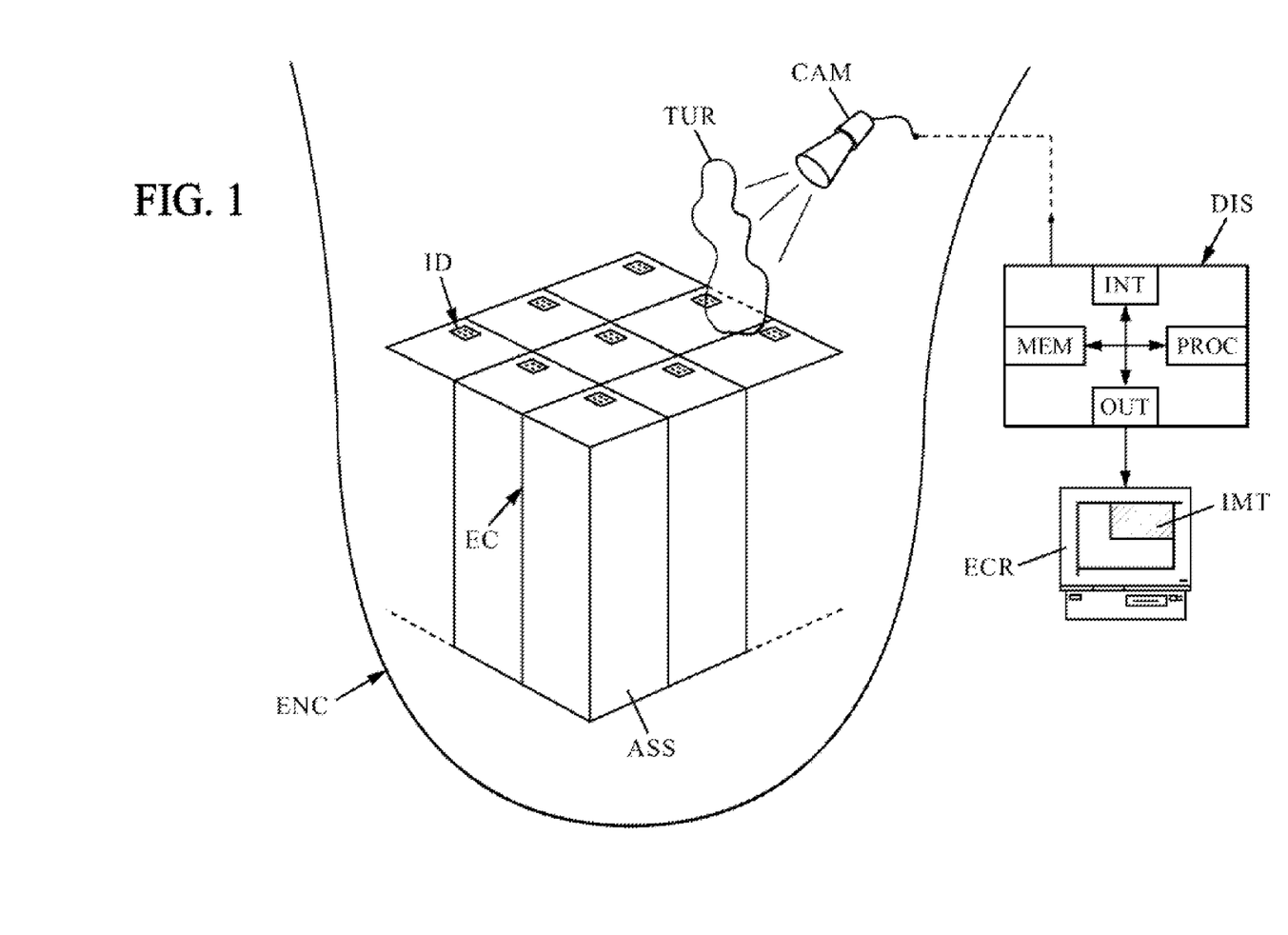
FIG. 1 shows schematically a reactor core in the framework of one implementation of the invention, together with an installation comprising a camera and a device for the implementation of the invention.

Reference is first of all made to FIG. 1 in which a reactor core in a vessel ENC filled with water comprises a plurality of nuclear fuel element assemblies ASS (each usually comprising a multiplicity of fuel rods for example). Each assembly ASS comprises an identifier ID (surrounded by a white circle in the view in FIG. 4) and the assemblies are spaced out by an inter-assembly separation EC.

A camera CAM is then provided filming the assemblies ASS and, in particular, a region referred to as "S holes" between such assemblies (not shown in FIG. 1) and/or at least one assembly identifier ID. The images obtained by the camera then allow:

for the S holes for example, the deformation of the hole to be identified within a useful time, in order to reduce the risk of catching of fuel element assemblies on pins used to stabilize the assemblies, and for reading the assembly identifier, in order to ensure that each fuel element assembly is at the location specified in a predetermined core plan.

These images are taken with the camera CAM immersed in the water in which the assemblies are immersed. Owing to the differences in temperature in the water in situ (resulting in local variations of the index of the water), optical turbulence phenomena TUR are created. The present invention provides a modeling of a turbulence affecting an image and uses this turbulence model for processing the images acquired. One advantageous embodiment allows translations of the camera which acquires these images to be processed, in particular using a technique for image repositioning which is adapted to the speed of translation.

Figure 4:
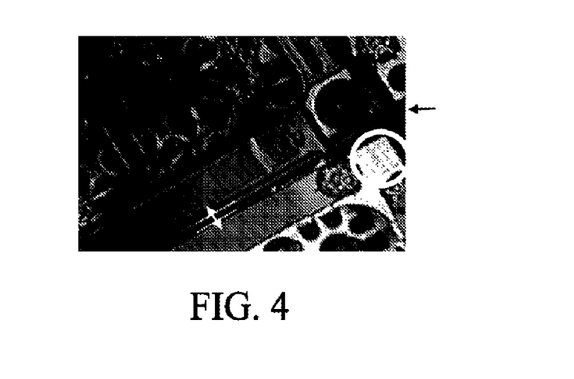
FIG. 4 illustrates a sharp image obtained after application of the method whose steps are illustrated in FIG. 3.

Again with reference to FIG. 1, the camera CAM is connected to a device DIS for the processing of the images acquired typically comprising:

an interface INT for receiving the acquired image data, a processor PROC and a working storage MEM for processing these image data, an output interface OUT for conditioning and communicating an image signal to a screen ECR then displaying the processed images IMT (one example of a processed image being shown in FIG. 4).

Thus, the use of the method in the sense of the invention is advantageous in the context of remote video inspections, notably at the end of fuel element reloading, currently constituting an important step in reactor shutdown operations for nuclear power stations producing electricity. These remote video inspections are carried out in order to verify the core plan (via the identification of the assembly numbers) and to localize with precision the assemblies (via, for example, the measurements of gaps between assemblies). Remote video inspections furthermore for example allow the positioning of assemblies to be verified.

The method is also advantageously applicable in the processing of a succession of images (photographs) for assisting notably in the calculation of the localizations of all or part of the assembly elements, but also in the inspection of the state of the assemblies, for example in the fuel hall.

The interpretation of these remote video inspections often poses difficulties owing to the release of heat from the fuel elements which causes turbulence phenomena in the water. Faced with these difficulties, a technique for processing the filmed sequences has been developed. The algorithms for this processing have been designed for operating in real time (hence for being capable of processing a video data stream live frame-by-frame).

Globally speaking, the processing is based on a probabilistic modeling of the effect of the turbulence on the pixels of the images. This turbulence model allows a restoration processing algorithm to be defined in two steps:

a first temporal filtering allows a stable, but blurred, image to be obtained (it is shown that this blurred image corresponds to the convolution of the original sharp image (unknown) with a linear spatial filter, whose expression is exactly equal to the probability density of the turbulence vector);

a second filtering, being spatial, for example of the Wiener type, allows the original image to be made sharp (which is thus obtained by linear de-convolution).

The processing in two steps described hereinabove is applicable when the camera is static. Owing to the convergence time of the temporal filter, it is preferable to immobilize the camera for a few seconds prior to obtaining a satisfactory restored image. In one advantageous embodiment, an image processing technique is then provided when the camera is moving (typically a translational movement, corresponding to the most frequent case).

In the case of a camera in translation, a step (optional but advantageous) for image repositioning is provided in order to allow the temporal filter to adapt to the variations of the camera. This image repositioning is carried out via a preliminary estimation of the movement of the camera. The performance characteristics are satisfactory, advantageously without loss of quality with respect to the processing with a static camera.

Hereinafter, as a first step, one example of a degradation model due to the turbulence is described.

Hereinafter, $I(x,n,c)$ denotes the value of the pixel with coordinates $x=(x, y)$ on the $n^{th}$ raw image received, for the component c (c=1, 2, 3 respectively for the red, green, blue components). Since the processing operations are identical on the three components, the notations are simplified by not mentioning the component processed, and $I(x,n,c)$ is simply written $I(x,n)$.

Under ideal conditions (absence of turbulence, static camera, constant scene), the images $I(x,n)$ of the filmed sequence result from the sampling of a single and same sharp, original and continuous image denoted $I_{sharp}(x)$, with $I(x,n)=I_{sharp}(x)$.

It is then considered that, in the presence of turbulence, each pixel of the image is displaced from its initial position. Denoting by $u_{x,n}$ the vector corresponding to the shift of the pixel x, in the image n, the following may be written:

$$I(x,n)=I_{sharp}(x+u_{x,n})$$

The displacements due to the turbulence are furthermore random. Finding an analytical expression for the displacement vector $u_{x,n}$ does not seem to be something that could be envisioned.

A probabilistic description of these displacements is then provided. The turbulence vector $u_{x,n}$ is considered as a random vector according to a certain probability density denoted:

$$h_{x,n}(u)$$

Making the assumption that the turbulence phenomena are stationary, both temporally and spatially (in the case of a liquid medium such as water), it may be considered that the probability density does not depend either on x, or on n, and the following may be written:

$$h_{x,n}(u)=h(u)$$

where h(u) is the probability density of the turbulence for any given image n and for any given pixel x.

The processing operations hereinafter are based on this hypothesis of stationarity of the turbulence phenomena. Indeed, by denoting as $I_m(x,n)$ the averaged image at the time n defined by:

$$I_m(x, n) = \frac{1}{n}\sum_{k=1}^{n} I(x, k),$$

it is shown that this averaged image converges towards a stable image $I_{stable}(x)$ equal to the convolution of the original sharp image (unknown) with the probability density of the turbulence:

$$I_{stable}(x) = \lim_{n\to\infty} I_m(x, n) = [I_{sharp} \otimes h](x)$$

Thus, in order to recover an unknown sharp image, the averaged image just needs to be de-convoluted by the probability density of the turbulence h(u). Since this probability density is not known, an empirical model is provided hereinafter for describing the variations in the probability density based on the two following physical considerations:
- the turbulence phenomena are in general isotropic, and the probability density must be independent of the angle of the vector u
- the small displacements of pixels are more frequent than the large displacements of pixels: thus, when the norm of the vector u decreases, the value h(u) must decrease.

Other factors may of course be involved in the choice of the model. For example, it may be practical to dispose of an analytical expression whose parameters are adjustable for h(u), and especially for its Fourier transform. A simple model which verifies all of these hypotheses is of the exponentially decreasing type, such as for example:

$$h_\sigma(u) = \frac{3}{\pi\sigma^2}\exp\left\{-\frac{\sqrt{6}\,\|u\|}{\sigma}\right\}$$

In this formula, σ represents the standard deviation (mean variation) of the norm of the turbulence vector. This parameter allows the difference in the level of turbulence according to the filmed sequences to be taken into account.

As a variant, a Gaussian model may be used. However, tests with an exponential model have given good results. Other types of models, exhibiting slower decreases than the Gaussian or exponential models, may of course be envisioned as further variants.

It is then possible to estimate the original image in two processing steps. As a first step, the sequence of raw images is time averaged. This averaged image converges towards a stable image $I_{stable}(x)$ equal to the convolution of the unknown sharp image (which would be observed in the absence of turbulence phenomena) with the probability density of the turbulence, with:

$$I_{stable}(x) = \lim_{n\to\infty} I_m(x, n) = [I_{sharp} \otimes h](x)$$

The de-convolution of the averaged image by the probability density of the turbulence then, as a second step, allows the original sharp image to be estimated.

Figure 2:
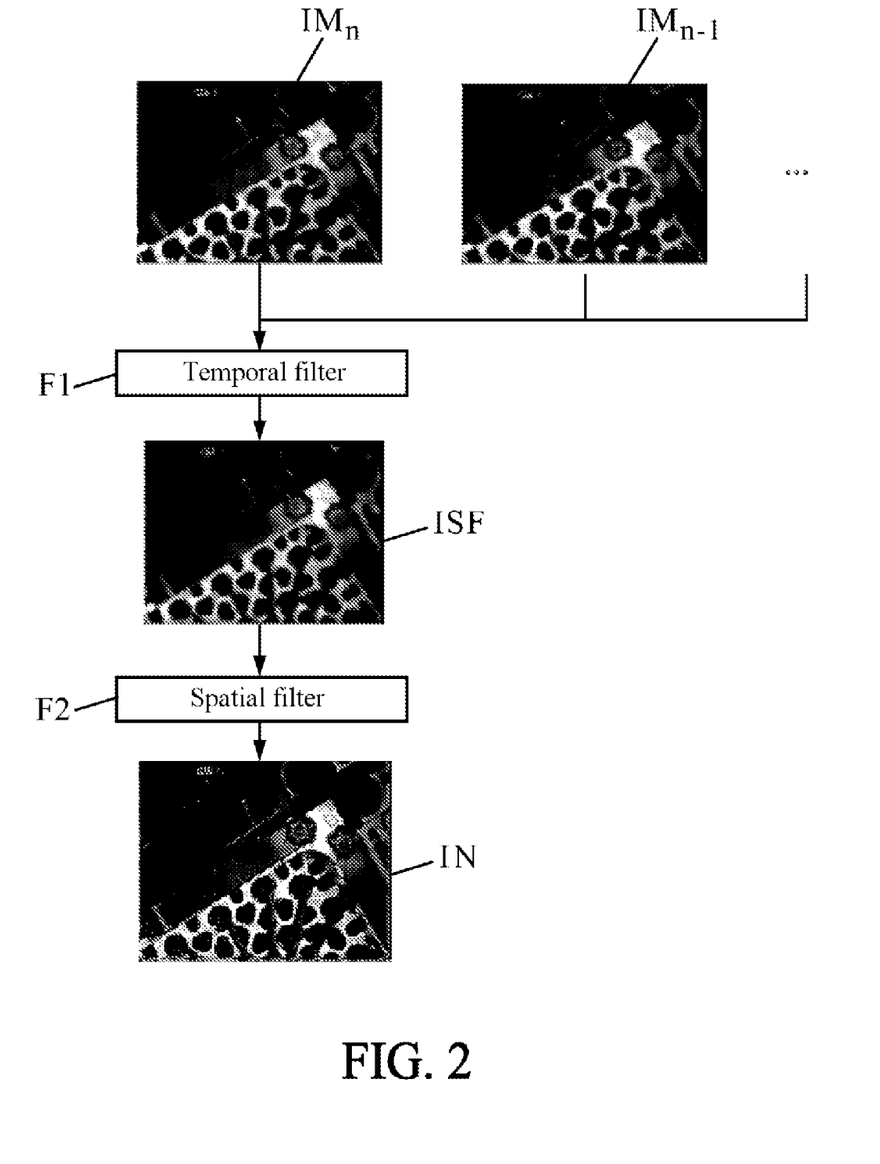
FIG. 2 illustrates schematically steps of the method in one embodiment of the invention, with the support of images both unprocessed and processed by the implementation of the invention.

FIG. 2 illustrates two main steps of the processing on real assembly images. A first (temporal) filter F1 allows an average, stable but blurred, image ISF to be obtained starting from a succession of images $IM_n$, $IM_{n-1}$, etc.

A second (spatial de-convolution) filter F2 allows the original sharp image IN to be restored, starting from the blurred image ISF.

The temporal filtering F1 is hereinafter described.

If the filmed scene is constant (ignoring the turbulence effects), notably in terms of lighting, zoom factor, etc., the $n^{th}$ averaged image is obtained by the following formula:

$$I_m(x, n) = \frac{1}{n}\sum_{k=1}^{n} I(x, k)$$

In this formula, the same weight is assigned to each image. In order to handle any potential variations in the scene (lighting and others), it is preferable to assign, in the averaged image, more weight to the recent images than to the past images. For the average image at the time n, the image $I_\alpha(x,n)$ is taken given by:

$$I_\alpha(x, n) = \frac{1-\alpha}{1-\alpha^n}\sum_{k=0}^{n-1} \alpha^k I(x, n-k)$$

The term α is a forgetting factor which allows more or less significance to be assigned to the past images (as a historical memory of the filter). The normalization by the term $$\frac{1-\alpha}{1-\alpha^n}$$

allows a geometrical sum of the weights $\alpha^k$ equal to 1 to be obtained, since:

$$\frac{1-\alpha}{1-\alpha^n}\sum_{k=0}^{n-1} \alpha^k = 1$$

The formula $I_\alpha(x,n)$ may take the form of a recursive temporal filtering followed by a normalization step. The $n^{th}$ output of the temporal filter, denoted $I_f(x,n)$, and the normalized output image, denoted $I_\alpha(x,n)$, are then linked by:

$$I_f(x, n) = \alpha I_f(x, n-1) + (1-\alpha)I(x, n)$$

$$I_\alpha(x, n) = \frac{1}{1-\alpha^n} I_f(x, n)$$

The value chosen for the forgetting factor $\alpha$ determines the performance characteristics of the temporal filter. In order to evaluate these performance characteristics, the mean quadratic difference between the pixel x of the $n^{th}$ image and the pixel x of the targeted stable image is defined as follows:

$$\Gamma_\alpha^2(x,n) = E\{(I_\alpha(x,n) - I_{stable}(x))^2\}$$

It is then possible to define a mean quadratic difference for the whole of the image n:

$$\Gamma_\alpha^2(n) = \frac{1}{N_{pixels}} \sum_x \Gamma_\alpha^2(x, n)$$

In the case of a constant scene, ignoring the turbulence effects, it is shown that:

$$\Gamma_\alpha^2(n) = \frac{(1-\alpha^{2n})(1-\alpha)}{(1-\alpha^n)^2(1+\alpha)} \Sigma^2$$

where $\Sigma^2$ is the mean variance of the pixels in a raw image. After convergence (when n tends to infinity), the residual quadratic difference of the normalized output of the temporal filter is given by:

$$\Gamma_\alpha^2(\infty) = \left(\frac{1-\alpha}{1+\alpha}\right) \Sigma^2$$

The calculations of the evolution of the standard deviation as a function of the number of images processed, for various values of the forgetting factor $\alpha$, show that, in the case of a static scene, it is preferable to choose $\alpha$ to be as large as possible. In the case of a variable scene however, the choice of a forgetting factor $\alpha$ results from a compromise between a short time for adapting to a change of scene (small $\alpha$) and a small residual standard deviation (large $\alpha$). If, for example, an abrupt change of scene (variation in lighting for example) occurs at a time $n_0$, whereas the temporal filter has converged, it is shown that the standard deviation between the output of the filter at the time n and the stable image becomes:

$$\Gamma_\alpha^2(n) = \left(\frac{1-\alpha}{1+\alpha}\right)\Sigma^2 + \alpha^{2(n-n_0)}\Delta^2$$

where $\Delta$ represents the mean variation in level caused by the change of scene.

Thus, the higher the forgetting factor $\alpha$, the longer the convergence time will be (around 300 images, or 12 seconds, for $\alpha=0.99$), but the residual standard deviation is sufficiently small (0.07 for $\alpha=0.99$) for the output image to be able to be stabilized. By reducing the chosen value of $\alpha$, the speed of convergence is increased (around 50 images, or 2 seconds, for $\alpha=0.95$) but the residual standard deviation is also increased (0.16 for $\alpha=0.95$). The output image is not entirely stabilized, even after convergence.

In one current embodiment, the forgetting factor is preferably set at 0.99, which is an optimum value in the case of a constant scene (ignoring the turbulence effects). Nevertheless, the processing presented here is sufficiently flexible to adapt to frequent variations in the filmed scene (typically a change of lighting).

In particular, in the case of a moving camera (presented hereinbelow), each element of the scene is only visible on a reduced number of images. It may be preferable to reduce the forgetting factor in order to assign a greater significance to the convergence time than to the residual variance.

The spatial filtering involved in a second step of the method is now described, in one exemplary embodiment.

According to the degradation model described hereinbefore, the normalized output $I_\alpha(x,n)$ becomes equal to the stable image $I_{stable}(x)$ (convolution of the unknown sharp image with the probability density of the turbulence), to which a noise $b(x,n)$ is added with a mean variance given by:

$$\Gamma_\alpha^2(n) = \frac{(1-\alpha^{2n})(1-\alpha)}{(1-\alpha^n)^2(1+\alpha)}\Sigma^2$$

which may be written:

$$I_\alpha(x,n) = [I_{sharp} \otimes h_\alpha](x) + b(x,n)$$

The estimation of the sharp image starting from the output $I_\alpha(x,n)$ therefore boils down to a problem of linear spatial de-convolution. The optimum restoration filter is given by the Wiener formula, being, in the spectral domain:

$$W_\sigma(f) = \frac{H_\sigma^*(f)}{\|H_\sigma(f)\|^2 + \frac{S_b(f)}{S_{sharp}(f)}}, \text{ if } \|f\| \leq f_c$$

$$W_\sigma(f) = 0, \text{ if } \|f\| > f_c$$

where:
  f is the two-dimensional vector (f=(f,g)) of the two normalized frequencies after 2D Fourier transform,
  $f_c$ is the cutoff frequency of the filter allowing any potential spectral aliasing on the input images to be eliminated,
  $S_b(f)$ and $S_{sharp}(f)$ are respectively the spectral power densities of the noise and of the sharp image to be recovered, and
  $H_\sigma(f)$ is the 2D Fourier transform of h(u).
With the exponential model chosen for h(u), then:

$$H_\sigma(f) = TF_{2D}\{h_\sigma(u)\} = \left(1 + \frac{2}{3}(\pi\sigma\|f\|)^2\right)^{-\frac{3}{2}}$$

In a first step, the assumption is made that the noise and the image have a constant spectral power density (image and white noise, $S_b(f)$ and $S_{sharp}(f)$ being constant). Given that the Fourier transform of a probability density is real, the optimum filter for restoration of the images is then given by:

$$W_\sigma(f) = \frac{H_\sigma(f)}{H_\sigma^2(f) + RBS}$$

Here, the term RBS denoting the "Signal-to-Noise Ratio" corresponds to the ratio between the power of the noise at the output of the temporal filter and the power of the sharp image (unknown). This restoration filter comprises two parameters: RBS and $\sigma$. These two parameters have an influence on the frequency response of the filter. In order to obtain an order of magnitude for RBS, it may be considered that the sharp image (unknown) has values of pixels distributed relatively uniformly over a range P. It is shown that the variance of the values taken by the pixels is then $P^2/12$. After convergence of the temporal filter, the residual variance at the output is equal to $(1-\alpha)/(1+\alpha)\cdot\Sigma^2$, where $\Sigma^2$ is the variance of the noise on the raw images and $\alpha$ is the forgetting factor of the filter. Thus, for the ratio RBS:

$$RBS = \frac{\left(\frac{1-\alpha}{1+\alpha}\right)\Sigma^2}{\left(\frac{P^2}{12}\right)} = 12 \cdot \left(\frac{1-\alpha}{1+\alpha}\right) \cdot \left(\frac{\Sigma}{P}\right)^2$$

For example, for a "noise/range of the image" ratio, before processing, of $\Sigma/P=0.1$, and with a forgetting factor $\alpha=0.99$, an RBS of $6\cdot10^{-4}$ is obtained. This result gives an order of magnitude of the optimum value of RBS.

The ratio RBS may be fixed empirically according to various tests on the processed images. Typically, it turns out that, when RBS tends to 0, the de-convolution filter tends to an inverse filter in $1/H_\alpha(f)$, high-pass and too sensitive to noise. A value that is too low for RBS therefore gives noisy restored images (a "grainy" noise having been observed on the processed images). If RBS tends to infinity, the de-convolution filter tends to the blur filter $H_\sigma(f)$. Too high a value for RBS therefore results in a blurred restored image. An optimum value for RBS is situated, according to the tests, between $10^{-4}$ and $10^{-2}$, so that a default value of $10^{-3}$ has been chosen.

The parameter $\sigma$ allows the restoration filter to be adapted to the standard deviation (mean variation) of the turbulence effects. Typically, if $\sigma$ is less than the real standard deviation of the turbulence effects, the blur of the time-filtered image (at the input of the spatial filter) is not completely attenuated. If $\sigma$ is higher than the real standard deviation of the turbulence effects, the high frequencies of the image are too highly amplified and the image is degraded. The optimum value of $\sigma$ strongly depends on the level of the turbulence effects and on the zoom factor (the turbulence effects degrading the video sequences to a greater extent when the zoom factor is large). One example of optimum value for $\sigma$ is in the region of 8 pixels for low levels of turbulence. In contrast, for high levels of turbulence with a large zoom factor, the optimum value for $\sigma$ is around 30 pixels. It will then be understood that $\sigma$ may be chosen between 0 and 30 pixels. This parameter can be updated as the images are acquired, during processing operations and depending on the quality of the images obtained.

Hereinafter, one embodiment is described in which a translation of the camera filming the images is taken into account.

The processing presented hereinbefore consisted in de-convoluting the normalized output from a temporal filter given by:

$$I_\alpha(x, n) = \frac{1-\alpha}{1-\alpha^n} \sum_{k=1}^{n} \alpha^{n-k} I(x, k)$$

However, this average hereinabove no longer makes sense if the camera is moving and if the raw images are shifted with respect to one another. In the case of a camera in translation, each image k is shifted by a certain vector $\delta_{n,k}$ with respect to the current image n. If each image is repositioned as a function of its displacement, the formula hereinabove becomes:

$$I_\alpha(x, n) = \frac{1-\alpha}{1-\alpha^{n(x)}} \sum_{k=n-n(x)+1}^{n} \alpha^{n-k} \tilde{I}(x + \delta_{nk}, k)$$

$\delta_{nk}=(\delta x_{nk}, \delta y_{nk})$ is the vector for the shifts in a column (along x) and in a row (along y) between the image k and the image n, and n(x) denotes the number of successive images containing the pixel x after repositioning.

The expression:

$$\tilde{I}(x+\delta_{nk}, k)$$

is the interpolation of the raw image at $x+\delta_{nk}$.

As in the case of a restoration on a static camera, the average image may take the form of a recursive filter followed by a normalization. The normalization here is more complex than in the case of a static camera, since the number of images available depends on the region of the image in question (normalization by pixel). It is nevertheless shown that it is expressed as follows:

$$I_f(x, n) = (1 - \alpha)I(x, n) + \alpha \tilde{I}_f(x + [\delta_{n,n-1}], n - 1),$$

$$I_\alpha(x, n) = \frac{1}{1 - \alpha^{n(x)}} I_f(x, n).$$

These expressions therefore involve the interpolation of the preceding output of the filter (time n−1).

In order to avoid interpolation operations that are costly in processing power, it is chosen to simplify the filtering equation as follows:

$$I_f(x, n) = (1 - \alpha)I(x, n) + \alpha I_f(x + \lfloor\delta_{n,n-1}\rfloor, n - 1),$$

$$I_\alpha(x, n) = \frac{1}{1 - \alpha^{n(x)}} I_f(x, n)$$

In this expression, the row and column shift vector, rounded to the nearest integers, between the current image n and the preceding image n−1, is denoted as:

$$[\delta_{n,n-1}]=(\lfloor\delta x_{n,n-1}\rfloor, \lfloor\delta y_{n,n-1}\rfloor).$$

It is shown that only one normalization matrix per pixel is calculated:

$$N(x,n)=1-\alpha^{n(x)}$$

by calculating the output of the repositioned temporal filter, when a constant image equal to 1 is set at the input over all the pixels.

The complete operation for temporal filtering with repositioning and normalization is finally written according to four steps:

resetting:

$$I_f(x,1)=0\ N(x,1)=0,$$

temporal filtering:

$$I_f(x,n)=(1-\alpha)I(x,n)+\alpha I_f(x+\lfloor \delta_{n,n-1} \rfloor, n-1),$$

Updating of the normalization matrix:

$$N(x,n)=(1-\alpha)\times 1+\alpha N(x+\lfloor \delta_{n,n-1} \rfloor, n-1)$$

Normalization of the output of the temporal filter:

$$I_m(x,n) = \frac{1}{N(x,n)} I_f(x,n)$$

Thus, as each image is received:
in a first step, the shift $\delta_{n,n-1}$ between the current image n and the preceding image n−1 is estimated,
this shift is used for repositioning the temporal filter and for calculating the normalization matrix for each pixel,
subsequently, the normalized output from the temporal filter is de-convoluted by a spatial filter.

The method of de-convolution is that described hereinbefore in the case of a static camera.

Hereinafter, an estimation of a translation between two images is described. Several types of approach exist for estimating the shift between various images. Simple techniques are favored here so as to envision real-time processing operations. The simplest approach consists in searching for the maximum inter-correlation between the images. In order not to be sensitive to noise, to turbulence effects and to variations in lighting, it is preferable not to work on the images themselves but on the contours of the image. The estimation of the shift between two images thus consists of two steps. In a first step, the two "contour" images are obtained by filtering the initial images. In a second step, the inter-correlation matrix between the two images is calculated. The coordinates of the inter-correlation maximum indicate the row and column shift between the two images.

The filter allowing the images of the contours to be obtained is a Sobel filter given by:

$$x \in [-M_{Sobel}\ M_{Sobel}]: Sobel(x) = \frac{-x}{\sqrt{2\pi} \cdot \sigma_{Sobel}^3} \exp\left\{\frac{-x^2}{2\sigma_{Sobel}^2}\right\}$$

where $\sigma_{Sobel}$ governs the passband of the filter and $M_{Sobel}$ is the size of the filtering window. Advantageous values of these parameters are $\sigma_{Sobel}=0.9$ pixels, $M_{Sobel}=5 \cdot \sigma_{Sobel}$.

The same filter is used for filtering the rows then the columns of an image I(x,y) so as to obtain the contour image denoted $I_{contour}(x,y)$:

$$I_{temp}(x,y) = \sum_{k=-M_{Sobel}}^{M_{Sobel}} Sobel(k) \cdot I(x-k, y)$$

$$I_{contour}(x,y) = \sum_{k=-M_{Sobel}}^{M_{Sobel}} Sobel(k) \cdot I_{temp}(x, y-k)$$

The inter-correlation between two contour images $I^1_{contour}(x, y)$ and $I^2_{contour}(x, y)$ is then given by:

$$\gamma(\delta x, \delta y) = \sum_x \sum_y I^1_{contour}(x,y) I^2_{contour}(x+\delta x, y+\delta y)$$

In order to substantially reduce the calculation time, the term:

$$\gamma(\delta x, \delta y)$$

may be obtained by using fast Fourier transforms:

$$\gamma(\delta x, \delta y)=\text{IFFT}\{\text{FFT}\{I_{contour}^1(x,y)\} \times \text{FFT}\{I_{contour}^2(N_{columns}-x, N_{rows}-y)\}\}.$$

In order to further reduce the calculation time, the estimation of the movement is only carried out over a single channel of the image. It can be the case that the rows of the raw images received are interlaced. It is preferable, in this case, to only keep every other row (for example the even rows) in the inter-correlated images. Lastly, in certain cases, the video sequence contains overwritten data (typically the date and the time, the name of the reactor, the coordinates of the assembly being filmed). It is of course recommended not to use this region of the image for estimating the shift.

The calculation of the repositioning is now described.

In order to reposition the successive outputs of the temporal filter between two images, a first solution consists in calculating, at each time n, the shift $\delta_{n,n-1}$ between the current image n and the preceding image n−1. Nevertheless, tests have shown that this approach cannot be applied to the case (frequent) of slow camera movement. This may be explained as follows: assuming for example that the movement of the camera results in a displacement of 0.3 rows per image and a zero displacement down the columns, the inter-correlation matrix between two successive images generally becomes a maximum at $\delta_{n,n-1}=([0], [0.3])=(0, 0)$. Thus, no displacement can be detected, and no image is repositioned, whereas the movement of the camera however requires a real repositioning of around 3 rows every ten images.

In order to be able to follow slow displacements (typically less than 0.5 rows or columns per image) another approach is hereinafter provided. The shift is estimated not between the current image n and the preceding image n−1, but between the current image n and a reference image $\delta_{n,ref}$.

The term $\delta_{n,n-1}$ is then simply given by:

$$\delta_{n,n-1}=\delta_{n,ref}-\delta_{n-1,ref}$$

Table 1 hereinafter illustrates such a processing in the case of a speed of variation of 0.3 rows per image. In this example, an average of three shifted images every 10 images is indeed estimated. The reference image is updated when the current image has been substantially shifted. A threshold of 20 pixels of maximum shift has been fixed, which allows any movement of the camera with a speed higher than 1/20 (or 0.05 rows/columns per image) to be managed, which turns out to be sufficient for the case of the applications envisioned.

TABLE 1

| index of the image | $n_{ref}$ | $n_{ref}+1$ | $n_{ref}+2$ | $n_{ref}+3$ | $n_{ref}+4$ | $n_{ref}+5$ | $n_{ref}+6$ | $n_{ref}+7$ | $n_{ref}+8$ | $n_{ref}+9$ | $n_{ref}+10$ |
|---|---|---|---|---|---|---|---|---|---|---|---|
| real shift current image/reference image | 0 | 0.3 | 0.6 | 0.9 | 1.2 | 1.5 | 1.8 | 2.1 | 2.4 | 2.7 | 3 |
| estimated shift current image/reference image $[\delta y_{n,ref}]$ | 0 | 0 | 1 | 1 | 1 | 2 | 2 | 2 | 2 | 3 | 3 |
| estimated shift current image/reference image $\delta y_{n,n-1} = [\delta y_{n,ref}] - [\delta y_{n-1,ref}]$ | — | 0 | 1 | 0 | 0 | 1 | 0 | 0 | 0 | 1 | 0 |

Figure 3:
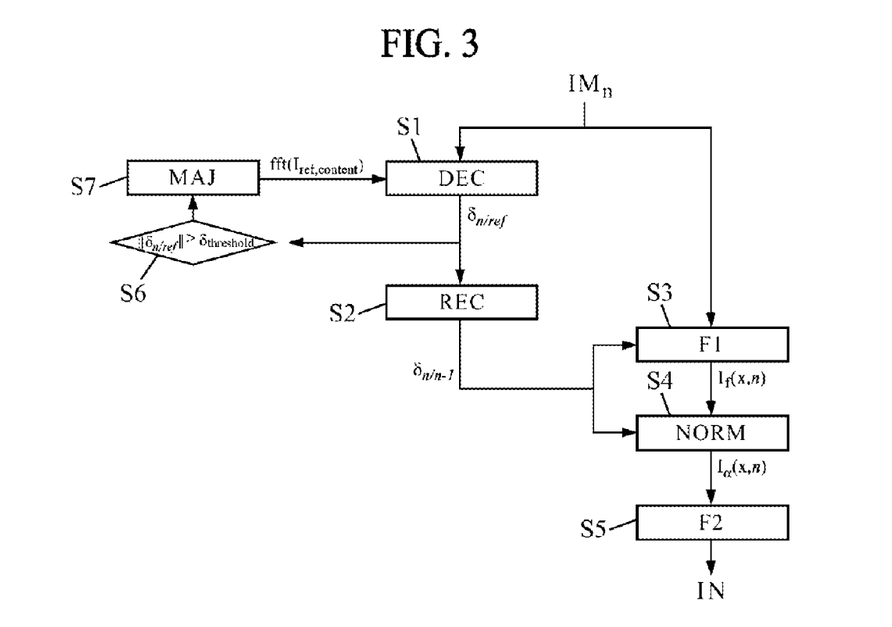
FIG. 3 is a schematic flow diagram of the steps of the method in one embodiment where the camera is movable in translation.

FIG. 3 summarizes the various steps of the image processing, in a moving situation, with:

using a current image $IM_n$ (time n), at the step S1, the estimation of the shift, and, in the case where the shift estimated at the step S1 exceeds a threshold (test S6), an update of the threshold at the step S7, at the step S2, the calculation of the repositioning, temporal filtering at the step S3 and the normalization by pixel at the step S4, and spatial filtering at the step S5 in order to obtain the sharp image IN.

The performance characteristics of the processing are satisfactory, with no loss of quality with respect to the processing using a static camera. Some artifacts may however appear when the camera starts to move after being at rest for a few seconds. These artifacts are nevertheless not functionally problematic. As illustrated in FIG. 4, these artifacts (row indicated by the black arrow in this figure) hinder neither the reading of an assembly number (within the white circle, carrying the number "2D EL"), nor the calculation of an inter-assembly spacing (double white arrow). Furthermore, these artifacts may be reduced by simple image processing techniques.

It goes without saying that the present invention is not limited to the embodiments described hereinbefore by way of example; it may be extended to other variants.

In the example hereinbefore, the temporal filter performs a simple averaging of the successive images of the video sequence. In this averaging, assigning a greater weight (or respectively lighter weight) to the images of good (respectively of poor) quality may be included. More generally, the temporal filter could be replaced by processing operations for combining more relevant images. These approaches assume however the definition of one or more quality indicators, calculated over the region of interest of the image (region containing the assembly number).

The spatial filter presented hereinbefore operates on the entirety of the image. As a variant, it may be envisioned to concentrate the processing on the region of interest. In particular, "prior knowledge" information such as the binary nature of the region containing the number could be taken into account in the restoration processing.

Moreover, the current spatial filter performs a Wiener de-convolution on the whole of the image. Other de-convolution processing techniques, using wavelets for example, could equally be used.

Furthermore, it should be noted that techniques for contrast enhancement by local equalization of histograms for the equalization of contrasts can be advantageous.

The invention claimed is:

1. A method for processing successive digital image data in images, acquired by a camera immersed in a liquid, wherein said liquid comprises differences in temperature resulting in local variations of index and involving a turbulence causing an effect of apparent displacement of pixels of the images, and wherein the method comprises:
   a modeling of the effect of the turbulence on the pixels of the images, and
   a de-convolution by said modeling of a time-averaged image, wherein the time-averaged image is estimated by a recursive temporal filtering, and wherein the average image $I_\alpha(x,n)$, estimated at the time n for a pixel with vector coordinates x, is given by:

$$I_\alpha(x, n) = \frac{1-\alpha}{1-\alpha^n} \sum_{k=0}^{n-1} \alpha^k I(x, n-k)$$

the term $\alpha$ being a real number corresponding to the forgetting factor, and wherein an $n^{th}$ output of the temporal filter, for the time n, denoted $I_f(x,n)$, and the average image $I_\alpha(x,n)$ are linked by the equations:

$$I_f(x, n) = \alpha I_f(x, n-1) + (1-\alpha)I(x, n)$$

$$I_\alpha(x, n) = \frac{1}{1-\alpha^n} I_f(x, n).$$

2. The method as claimed in claim 1, wherein the modeling comprises the estimation of a model of probability density of a displacement vector u relating to the effect of turbulence.

3. The method as claimed in claim 2, wherein said model is of the exponentially decreasing type.

4. The method as claimed in claim 3, wherein said model $h_\sigma(u)$ is expressed as a function of the vector u, by an equation of the type:

$$h_\sigma(u) = \frac{A}{\sigma^2} \exp\left\{-\frac{B\|u\|}{\sigma}\right\}$$

where:
   $\sigma$ represents the standard deviation of the norm of the vector u,
   A and B are positive real constants.

5. The method as claimed in claim 4, wherein $A=3/\pi$ and $B=\sqrt{6}$.

6. The method as claimed in claim 1, wherein the time-averaged image is estimated by an average weighted by powers of a forgetting factor, respectively decreasing as a function of time.

7. The method as claimed in claim 6, wherein the average image $I_\alpha(x,n)$, estimated at the time n for a pixel with vector coordinates x, is given by:

$$I_\alpha(x, n) = \frac{1-\alpha}{1-\alpha^n} \sum_{k=0}^{n-1} \alpha^k I(x, n-k)$$

the term α being a real number corresponding to the forgetting factor.

8. The method as claimed in claim 6, wherein the forgetting factor α is chosen equal to 0.99.

9. The method as claimed in claim 1, wherein said de-convolution comprises the application of a linear spatial filtering, with an expression corresponding to said modeling.

10. The method as claimed in claim 9, wherein the filtering is of the Wiener type.

11. The method as claimed in claim 10, wherein the modeling comprises the estimation of a model of probability density of a displacement vector u relating to the effect of turbulence,
and wherein the spatial filter is given in the spectral domain by:

$$W_\sigma(f) = \frac{H_\sigma^*(f)}{\|H_\sigma(f)\|^2 + \frac{S_b(f)}{S_{sharp}(f)}}, \text{ if } \|f\| \le f_c$$

$$W_\sigma(f) = 0, \text{ if } \|f\| > f_c$$

where:
  f is a two-dimensional vector of two frequencies normalized after two-dimensional Fourier transform,
  $f_c$ is a cutoff frequency of the filter for eliminating any potential spectral aliasing,
  $S_b(f)$ and $S_{sharp}(f)$ are respectively spectral power densities of a noise and of a sharp image to be determined, and
$H_o(f)$ is the two-dimensional Fourier transform of the probability density of the effect of the turbulence $h_o(u)$.

12. The method as claimed in claim 11, wherein the spatial filter is expressed by:

$$W_\sigma(f) = \frac{H_\sigma(f)}{H_\sigma^2(f) + RBS}$$

where the term RBS is expressed as a function of parameters chosen such that the term RBS is in the range between $10^{-2}$ and $10^{-4}$.

13. The method as claimed in claim 11, wherein said model $h_o(u)$ is expressed as a function of the vector u, by an equation of the type:

$$h_\sigma(u) = \frac{A}{\sigma^2} \exp\left\{-\frac{B\|u\|}{\sigma}\right\}$$

where:
  σ represents the standard deviation of the norm of the vector u,
  A and B are positive real constants,
and wherein the two-dimensional Fourier transform $H_o(f)$ of the probability density of the effect of the turbulence $h_o(u)$, is given by:

$$H_\sigma(f) = (1 + C(\sigma \cdot \|f\|)^2)^{-\frac{3}{2}}$$

where C is a positive real constant and a is a positive real number counted in number of pixels.

14. The method as claimed in claim 13, wherein the two-dimensional Fourier transform $H_o(f)$ is given by:

$$H_\sigma(f) = \left(1 + \frac{2}{3}(\pi\sigma \cdot \|f\|)^2\right)^{-\frac{3}{2}}$$

with σ in the range between 0 and 30 pixels.

15. A method for processing successive digital image data, acquired by a camera moving in translation immersed in a liquid comprising turbulence phenomena causing an effect of apparent displacement of pixels of the images, wherein a repositioning of a preceding image is applied to a current image, for the estimation of the average image, the method comprising:
  a modeling of the effect of the turbulence on the pixels of the images, and
  a de-convolution by said modeling of a time-averaged image, wherein the time-averaged image is estimated by a recursive temporal filtering,
the method further comprising a temporal filtering with repositioning and normalization, and wherein:
  the average image $I_\alpha(x,n)$, estimated at the time n for a pixel with vector coordinates x, is given by:

$$I_\alpha(x, n) = \frac{1-\alpha}{1-\alpha^n} \sum_{k=0}^{n-1} \alpha^k I(x, n-k)$$

the term α being a real number corresponding to the forgetting factor,
  an $n^{th}$ output of the temporal filter, for the time n, denoted $I_f(x,n)$, and the average image $I_\alpha(x,n)$ are linked by the equations:

$$I_f(x, n) = \alpha I_f(x, n-1) + (1-\alpha)I(x, n)$$

$$I_\alpha(x, n) = \frac{1}{1-\alpha} I_f(x, n)$$

and the method comprises the steps:
  for resetting, with:

$$I_f(x,1)=0 \; N(x,1)=0,$$

for recursive temporal filtering, with:

$$I_f(x,n)=(1-\alpha)I(x,n)+\alpha I_f(x+\lfloor\delta_{n,n-1}\rfloor,n-1),$$

where $$[\delta_{n,n-1}]=([\delta x_{n,n-1}],[\delta y_{n,n-1}])$$

corresponds to a row shift x and/or column shift y vector, rounded to the nearest integers, between the current image n and the preceding image n−1 owing to the translation of the camera,
  for updating a normalization matrix N, with:

$$N(x,n)=(1-\alpha)\times 1+\alpha N(x+\lfloor_{n,n-1}\rfloor,n-1)$$

and for normalizing the output of the temporal filter, with:

$$I_m(x, n) = \frac{1}{N(x, n)} I_f(x, n).$$

16. A non-transitory computer program product comprising instructions for the implementation of the method as claimed in claim 1 when this program is executed by a processor.

17. A device for processing image data, comprising an input for processing successive digital image data, acquired by a camera immersed in a liquid comprising differences in temperature resulting in local variations of index and involving a turbulence causing an effect of apparent displacement of pixels of the images, the device further comprising calculation means for the implementation of the method as claimed in claim 1.

18. The method as claimed in claim 1, wherein:
the liquid is the water of a nuclear installation; and
the image data is image data of fuel element assemblies,
the method further comprising:
determining, from the acquired and processed images, of a state of the fuel element assemblies.

19. The method as claimed in claim 18, further comprising:
determining, in said acquired and processed images, of at least one identifier of a fuel element assembly.

20. The method as claimed in claim 18, further comprising:
measuring, in said images, a spacing between fuel element assemblies.

21. An installation for processing image data acquired by a camera immersed in water of a nuclear installation, for filming fuel element assemblies as claimed in comprising at least one camera and one device as claimed in claim 17.

* * * * *

UNITED STATES PATENT AND TRADEMARK OFFICE
CERTIFICATE OF CORRECTION

PATENT NO. : 9,749,592 B2
APPLICATION NO. : 13/980394
DATED : August 29, 2017
INVENTOR(S) : Nicolas Paul and Antoine De Chillaz Page 1 of 1

It is certified that error appears in the above-identified patent and that said Letters Patent is hereby corrected as shown below:

In the Claims

In Claim 15, Column 18, Line 66, replace:

" $N(x,n) = (1-\alpha) \times 1 + \alpha N(x + \lfloor_{n,n-1}\rfloor n - 1)$ ,"

With:

-- $N(x,n) = (1-\alpha) \times 1 + \alpha N(x + \lfloor \delta_{n,n-1} \rfloor n - 1)$ --

Signed and Sealed this
Twentieth Day of February, 2018

Andrei Iancu
*Director of the United States Patent and Trademark Office*